Figure 1:
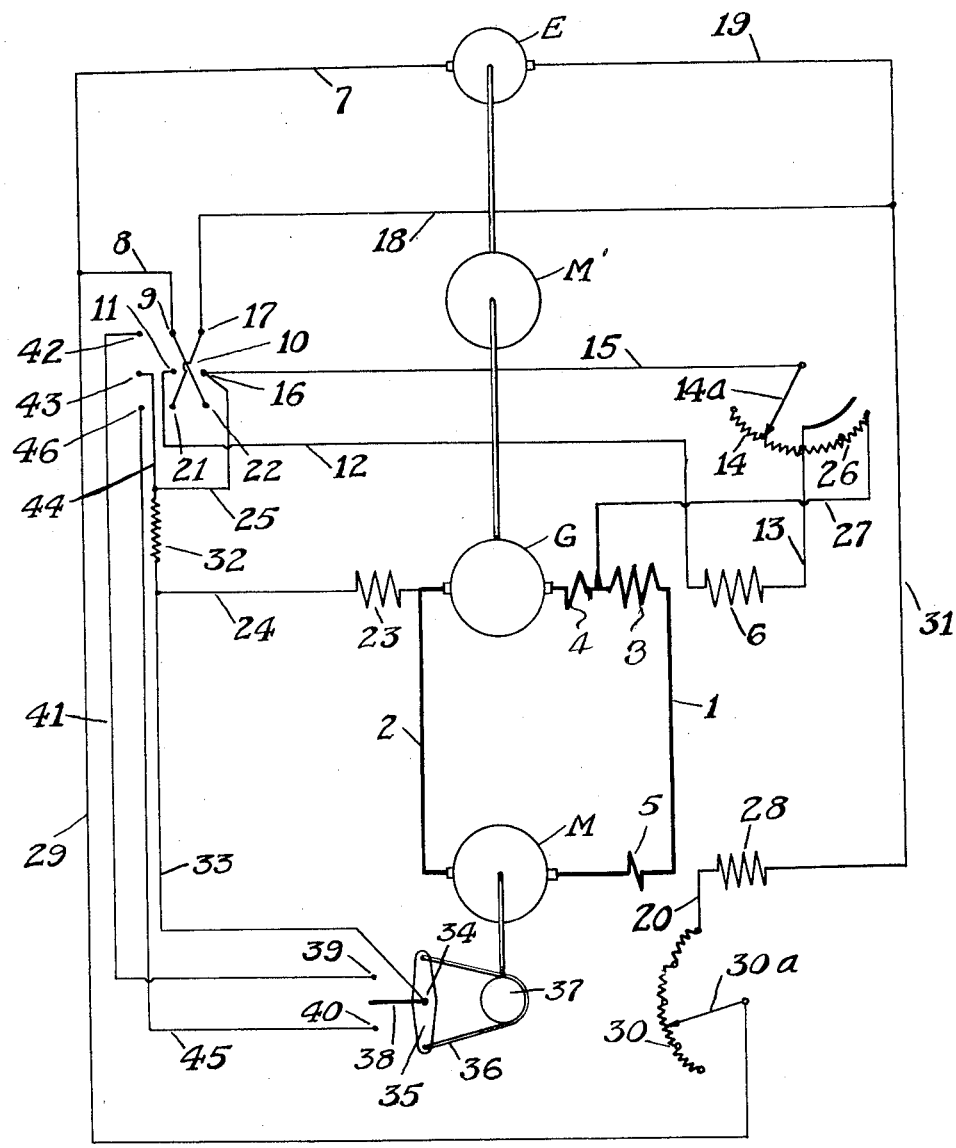

Nov. 14, 1933.  P. S. STEVENS  1,934,743
METHOD AND MEANS FOR CONTROLLING ELECTRIC MOTORS
Filed Aug. 20, 1928  3 Sheets-Sheet 1

Patented Nov. 14, 1933

1,934,743

UNITED STATES PATENT OFFICE 1,934,743

METHOD AND MEANS FOR CONTROLLING ELECTRIC MOTORS

Paul S. Stevens, South Milwaukee, Wis., assignor to Bucyrus-Erie Company, South Milwaukee, Wis., a corporation of Delaware Application August 20, 1928. Serial No. 300,675

14 Claims. (Cl. 172—239)

Motors have heretofore been controlled by influencing the generator from which the motor receives its current. Such a control is found in what is known as the Ward-Leonard apparatus. In handling some sorts of machines, such for instances as power excavators, peculiar conditions are encountered which require a variation from the controls heretofore used.

One of the difficulties, or problems encountered in such apparatus is the danger of delivering to the implement a greater power than the implement is designed to sustain. This is particularly of importance with relation to power shovels in that with an excessive power the shovel may be over-turned, or mechanical parts may be broken.

In an effort to correct this difficulty, heretofore apparatus of this type has been hooked up with a separately-excited main field and a differential series field for the generator, the generator being controlled by varying the resistance in the separately-excited field circuit. With such a structure, as the motor draws heavier current, the generator series field is increased and overpowers the separately-excited field and in consequence the net field strength is reduced so that at some definite pre-determined point the generator voltage dies, thus making a point of safety in the operation of the device. A serious defect, however, developed in this structure, in that this tapering-off was too gradual, so that in the higher working ranges the speed of the controlled motor was seriously affected. To correct this difficulty, the separately-excited field was supplemented by a self-excited shunt field, the effect of which was to boost the voltage of the generator and consequently the speed of the motor at a working range closer to this diminishing point of safety. This self-excited field, being directly excited by the generator, fades out at the safety point, when the series field neutralizes the separately-excited field and the self-excited shunt field so that as a matter of safety the arrangement is just as effective as where the self-excited shunt field is omitted, but in the working range the field strength of the self-excited shunt field is added to that of the separately-excited field as opposed to the series field, and consequently a better working condition is produced.

Difficulty arose in the operation of this last-mentioned apparatus, however, in that with such machines as power shovels very frequent and rapid stoppages and reversals are necessary and when, in the effort to stop the motor, the separately-excited field was diminished through the variable resistance of the control, the field strength of the self-excited field continued practically undiminished and would dominate in the last analysis the series field at light loads, and in consequence the motor could not be stopped, or at least not with rapidity, except by reversing the separately-excited field so as to buck down the greater strength of the self-excited field.

This difficulty may be considerably obviated by interposing, in the self-excited field circuit, a variable resistance which will be increased as the field strength of the separately-excited field is reduced. In this way the tendency of the self-excited field to remain built up, in spite of the reduction of the separately-excited field, is considerably obviated.

It is preferable, for convenience and simplicity of control, to make a part of the separately-excited field circuit and the self-excited field circuit in common; and, where this is done, the resistance interposed as to both fields may be a common resistance. Where, however, there is a common use of a part of both circuits there is a tendency, when resistance is thrown in against both the separately-excited and self-excited fields, for the separately-excited current to seek a path through the remainder of the self-excited circuit and thus reverse the self-excited field. The reason for this is that the separately-excited current remains practically constant whereas the self-excited current drops with the generator voltage. For this reason, if such device is utilized, the full range of control cannot be had through the common resistance, but may be made available if a supplemental, or additional, resistance is placed in the self-excited field circuit. Preferably such a resistance should be variable and should remain in so long as the common resistance is operating on the two field circuits. After the main, or common resistance has been cut out, then, in order that the full strength may be had, this supplemental or additional resistance in the self-excited field circuit may also be cut out.

Features and details of my invention will appear more fully from the specification and claims.

A preferred embodiment of the invention and manner of practicing the method is illustrated in the accompanying drawings as follows:—

Fig. 1 shows the system, or apparatus, diagrammatically.

Figure 2:
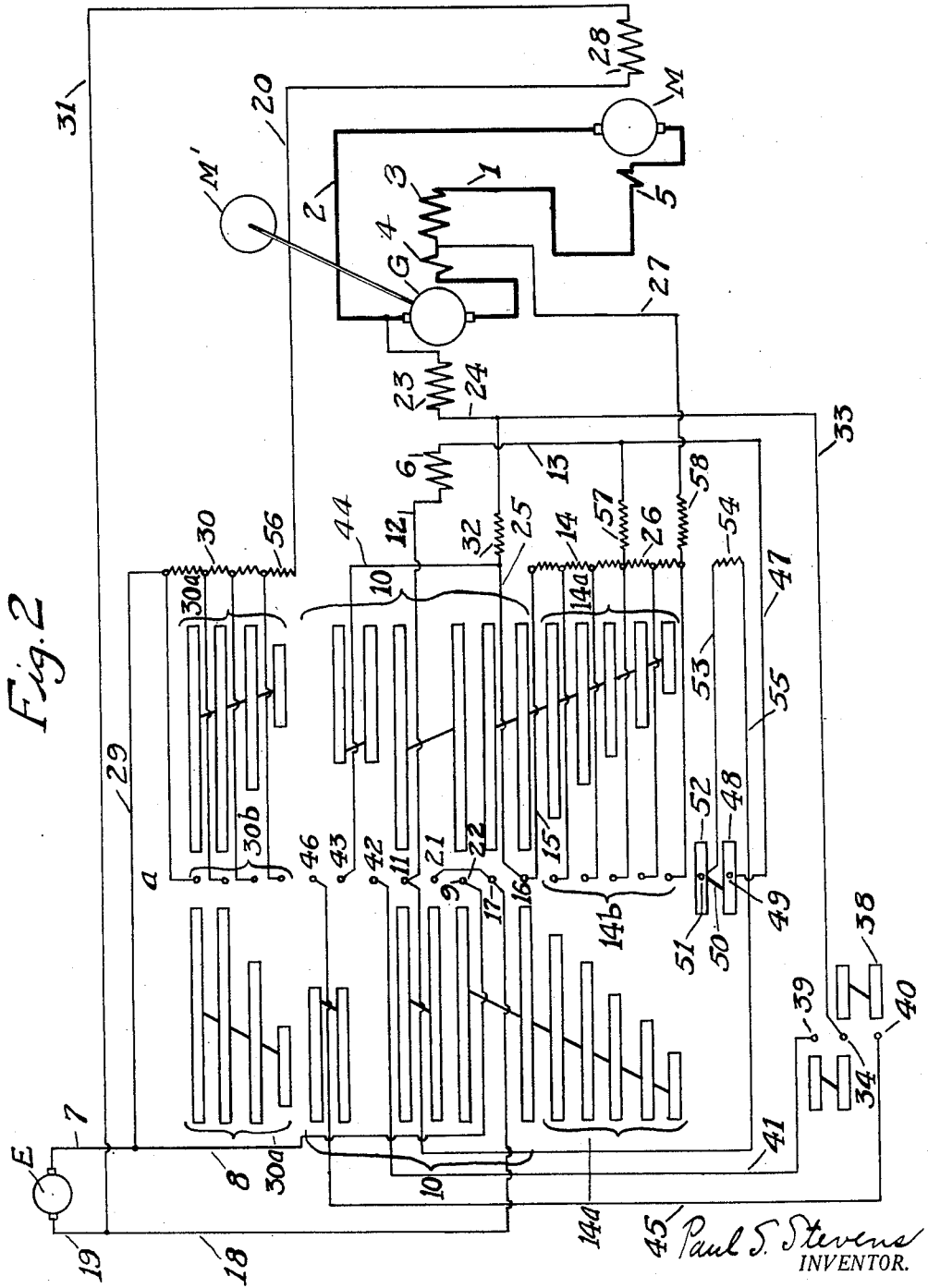

Fig. 2 a view in which the system is illustrated in conection with a development of an ordinary controller.

Figure 3:
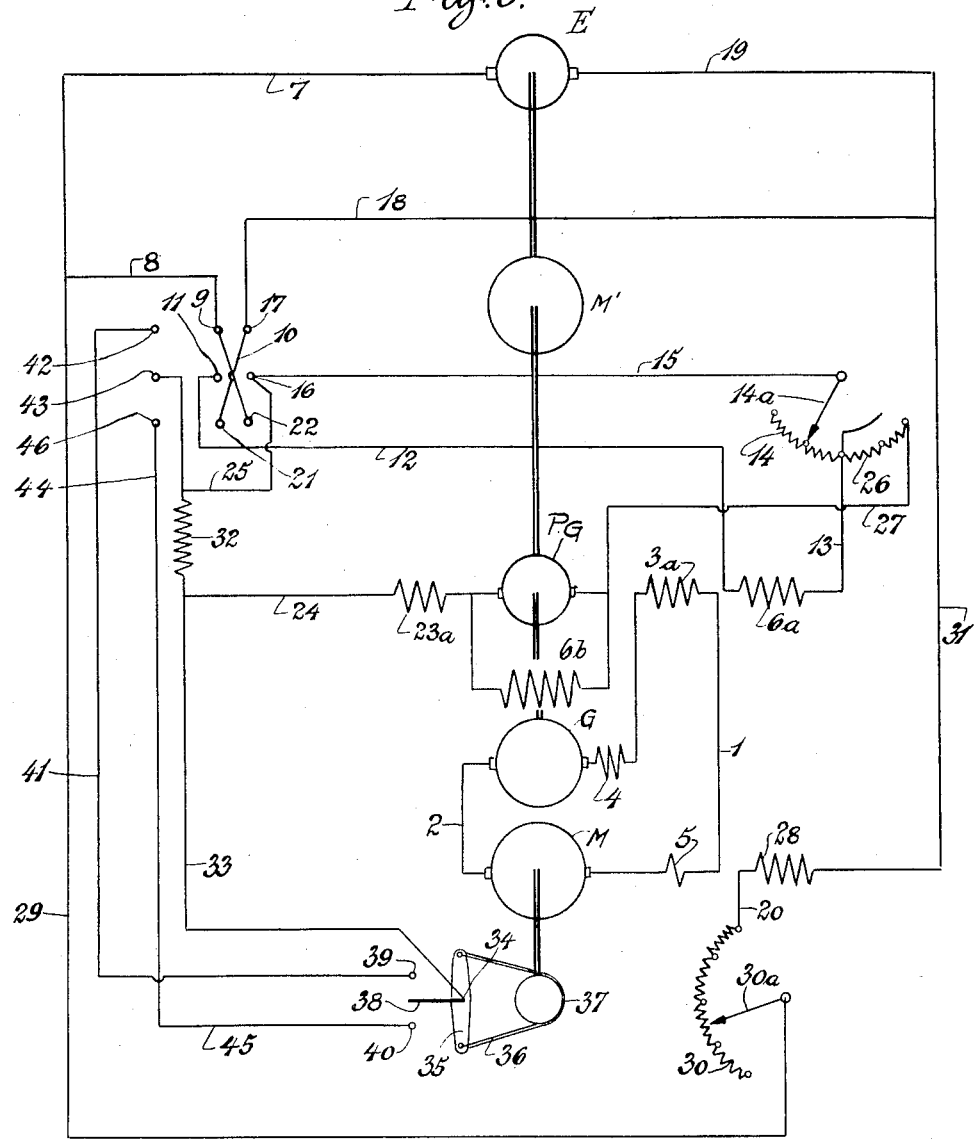

Fig. 3 shows a modification of the device of Fig. 1, this modification consisting in the addition of a pilot generator.

M' marks a prime mover. As shown, this is indicated as an electric motor but may be any form of prime mover. A generator G is mechanically connected with this prime mover and an exciter E may also be directly connected with such prime mover. The controlled motor M, such for instance as the hoisting, swinging, or crowding motor of a power shovel, is electrically connected and driven from the generator, being directly connected thereto by wires 1 and 2. A generator field 3 is arranged in series in the wire 1, and a commutator field 4 may also be in series in the usual manner. A commutator field 5 may also be in series in the line 1 for the motor M.

A separately-excited field 6 is the main operative field of the generator. It is opposed, and at high current demands neutralized, by the differential series field 3 of the generator. This is connected with the exciter E through the following circuit: A wire 7 leads from the exciter. It is connected by a wire 8 to the post 9 of a reversing switch 10. In a forward direction, current is carried by the switch to a post 11, passes by a wire 12 from the post 11 to the field winding 6, and from this winding, by a wire 13 to the variable resistance 14 controlled by the movable arm 14a, and from this movable arm by a wire 15 to a post 16, from the post 16 by the reversing switch 10 to a post 17 and thence by wires 18 and 19 to the exciter. By varying the resistance 14 the strength of the field 6 may be varied to vary the effective field of the generator, thus varying its voltage and in consequence the power of the motor.

The reversing circuit is indicated as follows: When the reversing switch is thrown, a post 21 is connected with the post 11, and a post 22 is connected with the post 16, thus reversing the current through the circuit passing through the field winding 6.

A self-excited shunt field 23 is provided for the generator G. This field supplements the separately-excited field 6, and is, like field 6, opposed by the series field 3. The circuit for field 23 passes from one pole of the generator, through wire 27, resistance 26, variable common resistance 14, movable arm 14a, wire 15, post 16, wire 25, wire 24 (through either a shaft switch or a resistance, hereinafter described), field 23, and an unnumbered wire, to the other pole of the generator. It will be noted that resistance 14, movable arm 14a, and wire 15 are common to both this circuit and the circuit for the separately excited field 6. Field 23 is thus subjected, in common with field 6, to the resistance 14, and to the variation of this resistance, and in consequence field 23 is cut down as field 6 is cut down. This arrangement obviates the tendency of the generator G to over-run by reason of the continued field strength in the self-excited field 23 as above suggested.

But there is a limit to the amount of common resistance 14 which can be interposed in the circuits of both separately-excited field 6 and self-excited field 23, without causing trouble. When too much of such resistance is so interposed, it blocks both circuits. Each, therefore, finds an easier route elsewhere. The generator current all passes through the motor M. The exciter current, on reaching post 16, being blocked by resistance 14 from reaching field 6 through wires 15 and 13, passes by one of three routes (hereinafter mentioned in connection with the shaft-switch) to field 23, where it overcomes the generator current and reverses field 23. Thence it passes, through wire 2, motor M, and wires 1, 27 and 13, to field 6, which it traverses in the normal direction; and thence passes, by wire 12, back to the exciter. The reversal of field 23 tends to breakdown the generator voltage thus making all the foregoing even easier.

As resistance 14 increases, this tendency of the exciter current to by-pass through field 23 increases, until finally field 23 overcomes field 6, and reverses the generator, thus reversing the motor without the reversing-switch 10 being set to reverse the motor. A very undesirable result.

In all the foregoing, we have assumed the absence of resistance 26, the insertion of which prevents the above-described misrouting of the exciter current. This resistance is preferably so arranged with relation to the controller that it may be thrown out after the common resistance 14 is thrown out, and may be again interposed prior to such resistance in the section 14 as would tend to reverse the motor, or disturb the control. All this assumes that the fields 6 and 23 are so wound that, with these two fields cumulating, the exciter current through field 6 and the generator current through field 23 traverses resistance 14 in the same direction.

A field 28 for the motor may be arranged in the exciter circuit, this circuit being traced from the wire 7 through the wire 29, movable arm 30a, variable resistance 30, wire 20, the field 28, and wire 31, to the wire 19 leading to the exciter. This operates in the well-known manner.

When switch 10 is thrown to reverse, and resistance is gradually cut-out by rheostat 14 so as to speed up the reversal, field 23, which still maintains its old sense, becomes stronger and stronger in its old sense, the more the effort is made to reverse; thus field 23 bucks the now-reversed field 6. In order to avoid this field strength in the field 23, which obviously tends to delay the reversal of the motor, I interpose the resistance 32 in the self-excited field circuit between the wires 25 and 24; and, so long as the motor moves forward with the controller in reverse position this resistance 32 will remain in the self-excited field circuit. The control of the self-excited circuit for this purpose is accomplished by what is known as a shaft switch which is thrown by the motor itself. The connections for this shaft switch are as follows: A wire 33 extends from the wire 24 to a post 34 on a switch arm carrier 35. This carrier is in the form of a rocking bar, the ends of which are connected by a belt 36 with a pulley 37 mechanically connected with the motor M. As the motor moves in either direction, it operates through the belt 36 to throw the carrier 35 in the direction toward which the pulley moves and after throwing this carrier, the rotation of the motor holds the carrier in the new position through the friction of the belt on the pulley. A switch arm 38 is carried by the carrier 35 and is adapted to contact post 39 or 40 selectively.

There are three possible circuits by which the generator current may selectively reach field 23, depending on the direction in which the switch 10 is set and the direction in which the motor M is turning. In one of these circuits, that is to say whenever the motor is turning in the opposite direction from that in which the switch 10 is set for it to turn, the current will pass through the permanent resistance 32. But in the other two of the circuits, that is to say whenever the motor is turning in the same direction as that in which switch 10 is set for it to turn, the current will be shunted around this permanent resistance.

Switch 10 is thrown up for motor M to rotate clockwise. If the motor is rotating clockwise, the shaft-switch 38 will likewise be thrown up. Current will pass from generator G, through commutator field 4, wire 27, variable resistances 26 and 14, movable arm 14a, wires 15, 25 and 44, posts 43 and 42, wire 41, post 39, shaft-switch 38, wires 33 and 24, and field 23, back to generator G.

Switch 10 is thrown down for motor M to rotate counter-clockwise. If the motor is rotating counter-clockwise, the shaft-switch 38 will likewise be thrown down. Current will pass from generator G, through commutator field 4, wire 27, variable resistances 26 and 14, movable arm 14a, wires 15, 25 and 44, posts 43 and 46, wire 45, post 40, shaft-switch 38, wires 33 and 24, and field 23, back to generator G.

But if, with switch 10 thrown up, the motor M is rotating counter-clockwise, with the shaft-switch 38 correspondingly down, or if with switch 10 thrown down, the motor M is rotating clockwise, with the shaft-switch 38 correspondingly up, the current will pass from generator G, through commutator field 4, wire 27, variable resistances 26 and 14, movable arm 14a, wires 15 and 25, permanent resistance 32, wire 24, and field 23 back to generator G.

When the motor changes its direction of rotation, the switch arm 38 reverses with it and is thus re-set to throw in the resistance 32 upon a reversal of the controlling switch.

In the three preceding paragraphs, in order to simplify the comparison under discussion, I have kept a uniform order of description in each of the three paragraphs, although it should be obvious that, under certain of the situations under discussion, the current will traverse the elements in a direction reverse to that described.

In Fig. 2 I have indicated a practical installation carrying out the scheme as illustrated diagrammatically in Fig. 1. In this figure I have indicated a controller as developed, and the same parts as appear in Fig. 1 are identified with the same reference numerals. The several contact fingers are indicated in a line a and the wires having the circuits, as indicated in the diagram, lead to these several contacts. The movable arm 30a of the diagram, Fig. 1, corresponds to the group of segments 30a electrically connected together and operating in connection with contacts 30b in the ordinary controller manner, the contacts being connected with the resistance sections 30 and being cut out successively in the ordinary manner of a controller, and thus controlling the resistance to the field of the motor as in common practice. These segments are arranged at opposite sides of the line a and operate in exactly the same manner, one set of segments for the forward motion and the other for the reverse. These may be varied, if desired, to suit varying conditions, as for instance, when there is a marked difference of power requirements in one direction than in the other, as in a hoisting motor on a power shovel.

The contacts of the reversing switch are indicated in the line a and operate in relation to a series of segments, the group of which are indicated at 10 corresponding to the reversing switch in Fig. 1. These operate in the ordinary manner of controller reversing switches.

In like manner the movable arm 14a, as indicated in Fig. 1, corresponds to the series of segments 14a on the controller drum operating in connection with contacts 14b, successively cutting out sections of the resistance 14 in the usual manner. The end segments 14a operating in connection with the resistance sections 26 cut out this resistance after the sections 14 are cut out. The line connections with relation to the generator fields and exciters can be readily followed, these circuits being exactly as outlined in the diagram, Fig. 1.

The shaft switch is also indicated in Fig. 2, the segments 38 corresponding to the arm 38 in operation and the apparatus for operating these segments being as indicated in the diagram in Fig. 1. In Fig. 2, the movement of the controller to the right corresponds to throwing switch 10 down in Fig. 1; but movement of the shaft-switch 38 to the right in Fig. 2 corresponds to its movement up in Fig. 1. It should also be noted that whenever the controller is returned to neutral, the controller segments no longer connect finger 43 to either finger 42 or finger 46, and accordingly, regardless of the setting of the shaft switch, it is not possible to short the circuit of field 23 around resistance 32.

Accordingly resistance 32 is always in the circuit of field 23 whenever either the controller is in neutral, or the motor is running in a direction contrary to that for which the controller is set for it to run.

Thus my invention makes it possible, in a simple and convenient manner, to straighten the voltage of the generator throughout the working range of the motor, while still maintaining the ability to stop the motor quickly by moving the controller to neutral or beyond.

In addition I have shown in Fig. 2 the discharge resistor which as shown interposes a discharge resistance against the generator separately-excited field when the controller is in the off-position and the field is thus disconnected from the exciter. This may be readily followed in the drawings, starting with the field 6. The connection runs by wire 13 and wire 47 to a contact 49, (this contact, when the controller is in neutral position, being operated on by the segment 48 which is connected by wire 50 with segment 52), and thence, by contact 51 and wire 53, through discharge resistance 54, wire 55, contact 11 and wire 12, to the other side of the field. The purpose of this is well understood.

It will be noted that the segments of the reversing switch operating on the contacts 42, 43 and 46 are somewhat shortened so that the resistance 32 will cut into the circuit during shutting off the controller, as well as under the influence of the shaft-switch. This cumulates with the effect of resistance 26, and hence in effect adds one more stage to resistance 26.

It will be noted that I have interposed in the practical embodiment, the permanent resistances 56, 57 and 58 in the several field-circuits, for the purpose of adjustment.

While I have shown in these figures a direct connection between the controller and the various fields controlled thereby it will, of course, be understood that the controller may act merely as a pilot operating separately interposed magnetic contacters, where the current or voltage requirements are too great to be handled directly by the controller. To the same end, the controls herein described may operate on a pilot generator, the pilot generator, acting as an exciter for, and controlling the characteristics of, a main generator, which furnishes current direct to the motor. Such a pilot arrangement is illustrated by Figure 3, which is identical to Figure 1, with the following exceptions. The separately excited field 6a, the self-excited shunt field 23a, and the series field 3a of the generator G, are applied as three fields to the pilot generator PG, being respectively excited by the exciter E, the pilot generator PG and the main generator G (in series in the armature circuit of the main generator G and the motor M); and the main generator G has but one field 6b, which is excited from the armature of the pilot generator PG. But in each case the motor is directly responsive to generator voltage in that the motor control is accomplished through the generator control. I do not wish to be limited, therefore, to a control which operates directly upon the wires of the generator furnishing the main current to the motor, as such pilot arrangements may be used where such current is sufficiently great to make the use of a small controller impractical.

When, in any of the claims, I recite a resistance "common" to two fields, I mean a resistance such that, whenever any part of it is inserted in one of the two fields, the same part is simultaneously inserted in the other field. But, rather than employ a long circumlocution to this effect in each of the claims, I shall use merely the word "common", as thus defined.

The use of the word "directly" in any of the claims, is not to be construed to preclude a response by the motor to the current of a pilot generator, acting on the motor through the main generator.

The word "current" is used in the claims in its broad and colloquial sense, rather than in the more restricted narrow sense of meaning "amperage"; for, of course, it is the voltage produced by the armature of the generator that determines the characteristics of the motor in a Ward-Leonard system.

I make no claim that I was the first to conceive the use of a variable resistance common to the circuits of fields 6 and 23, nor that I was the first to conceive the use of shaft-switch 38 and associated parts for the purpose and in the manner described and shown by me. Claims to these features appear in the co-pending application of Rowland W. Barr, filed February 21, 1929, Serial No. 341,600½.

What I claim as new is:—

1. In an electric control mechanism, the combination of a generator, comprising a self-excited shunt field and a separately excited field, the self-excited field cumulating with the separately-excited field; electric circuits therefor; variable resistance in the circuit of each field; means for varying this resistance simultaneously, and in the same sense, with respect to each of such two fields; and a motor connected with and directly responsive to generator current.

2. In an electric control mechanism, the combination of a generator, comprising a self-excited shunt field, a separately-excited field, and a series field opposed to the separately-excited field; electric circuits therefor; variable resistance in the circuits of the self-excited field and the separately-excited field; means for varying this resistance simultaneously, and in the same sense, with respect to each of such two fields; and a motor connected with and directly responsive to generator current.

3. In an electric control mechanism, the combination of a generator, comprising a self-excited shunt field, a separately-excited field and a series field; electric circuits therefor; variable resistance in the circuits of the self-excited field and the separately-excited field; means for varying this resistance simultaneously, and in the same sense, with respect to each of such two fields; a motor connected with and directly responsive to generator current; and means reversing the separately-excited field to reverse the generator and motor.

4. In an electric control mechanism, the combination of a generator, comprising a self-excited field and a separately-excited field; electric circuits for said fields, a part of said circuits being in common; means for interposing a common variable resistance in circuit with both fields; means for interposing additional resistance in the circuit of the self-excited field; and a motor connected with and directly responsive to generator current.

5. In an electric control mechanism, the combination of: a generator, including a self-excited shunt field, a separately-excited field cumulative therewith, and a series field opposed thereto; circuits for said fields, parts of the circuits of the self-excited shunt field and the separately-excited field being in common; means for interposing a common variable resistance in circuit with the self-excited shunt field and the separately-excited field; means for interposing additional resistance in the circuit of the self-excited shunt field only; and a motor connected with and directly responsive to generator current.

6. In an electric control mechanism, the combination of: a generator, including a self-excited shunt field, a separately excited field cumulative therewith, and a series field opposed thereto; circuits for said fields, parts of the circuits of the self-excited shunt field and the separately excited field being in common; means for interposing a common variable resistance in circuit with the self-excited shunt field and the separately excited field; means for interposing additional resistance in the circuit of the self-excited shunt field only, before the interposition of at least some of the common resistance; and a motor connected with and directly responsive to generator current.

7. In an electric control mechanism, the combination of: a generator, comprising a self-excited field and a separately-excited field; circuits for said fields, parts of said circuits being in common; a common resistance in circuit with both fields; additional resistance in circuit with the self-excited field only; a motor connected with and directly responsive to generator current; means for reversing this motor; a second additional resistance; and a motor-actuated switch holding the second additional resistance in the self-excited field circuit alone, whenever the motor is running in the opposite direction from that in which the reversing means is set for it to run.

8. In an electric control mechanism, the combination of: a generator, comprising a self-excited field and a separately-excited field; circuits for said fields, parts of said circuits being in common; a common variable resistance interposable in circuit with both fields; additional resistance interposable in the circuit of the self-excited field only; a motor connected with the generator and directly responsive to generator current; means for reversing the motor; a second additional resistance; and a motor-actuated switch, holding the second additional resistance in the self-excited field alone whenever the motor is running in a direction opposite to that in 9. In an electric control mechanism, the combination of a generator, comprising a self-excited field and a separately-excited field; circuits for said fields; means for interposing resistance to said fields; a motor connected with and directly responsive to generator current; controlling means reversing the generator current; a second resistance; and a motor-controlled switch, holding the second resistance in the self-excited field circuit whenever the motor is running in the opposite direction from that in which the reversing means is set for it to run, the controlling means continuing the second resistance in the self-excited field circuit through a low voltage setting of the controlling means and throwing out the resistance with a high voltage setting.

10. In an electric control mechanism, the combination of a generator, comprising a self-excited shunt field and a separately-excited field; circuits for said fields, parts of said circuits being in common; means for interposing a common variable resistance in circuit with both fields; means for interposing additional resistance in the circuit of the self-excited field alone, before the interposition of at least some of the common resistance; a motor connected with and directly responsive to generator current; controlling means controlling and reversing the generator current; a second additional resistance; a motor-actuated switch, holding the second additional resistance in the self-excited field circuit alone, whenever the motor is running in the opposite direction from that in which the reversing means is set for it to run; and means for throwing-in this second additional resistance as one stage of the first additional resistance.

11. The method of controlling an electric motor through a generator supplying current thereto, which method consists in supplying a field strength for the generator from sources independent of the generator, in shunt relation with the generator and in series with the generator, varying the field strength of the generator which is supplied from the source independent of the generator and simultaneously and in the same sense varying the effect which the generator voltage has to increase the field strength of the generator.

12. The method of controlling an electric motor through a generator supplying current thereto, which method consists in supplying a field strength for the generator from sources independent of the generator, in shunt relation with the generator and in series with the generator, varying the field strength of the generator which is supplied from the source independent of the generator and simultaneously and in the same sense varying the effect which the generator voltage has to increase the field strength of the generator, and then further increasing the effect which the generator voltage has to increase the field strength of the generator.

13. The method of controlling an electric motor through a generator supplying current thereto, which method consists in supplying a field strength for the generator from sources independent of the generator, in shunt relation with the generator and in series with the generator, then first decreasing alone the effect which the generator voltage has to increase the field strength of the generator, then decreasing both this effect and simultaneously and in the same sense decreasing the field strength independently of this effect and finally damping down the last-mentioned effect through generator current.

14. The method of controlling an electric motor through a generator supplying current thereto, which method consists in supplying a field strength for the generator from sources independent of the generator, in shunt relation with the generator and in series with the generator, varying the field strength of the generator which is supplied from the source which is independent of the effect of generator voltage and simultaneously and in the same sense varying the effect which the generator voltage has to increase the field strength of the generator and whenever the motor stalls, or is accelerated too fast counteracting the excitation of the generator through the increase of generator current thereby produced.

PAUL S. STEVENS.